Sept. 12, 1950 — E. L. McCARTHY — 2,522,390
LENS SYSTEM
Filed July 4, 1945 — 2 Sheets-Sheet 1
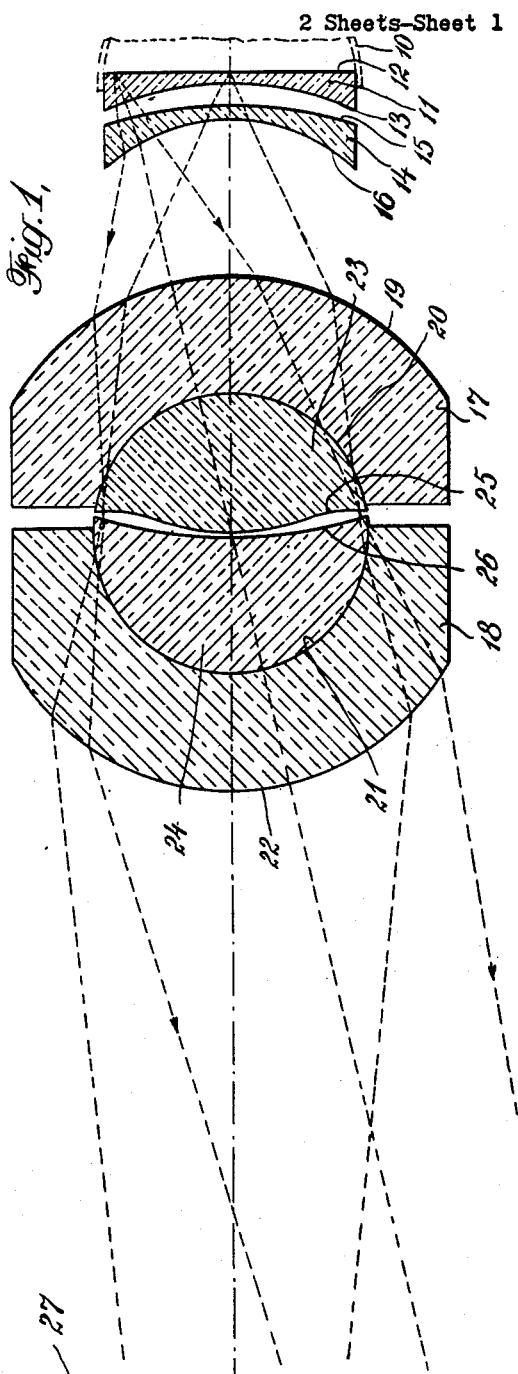
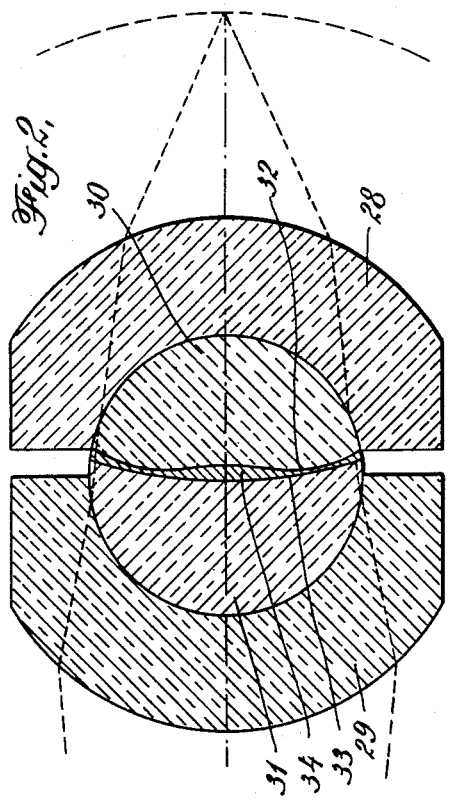
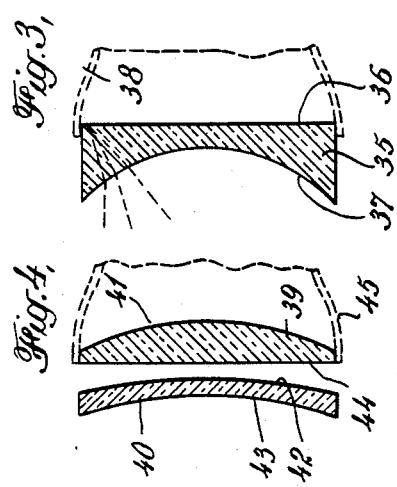
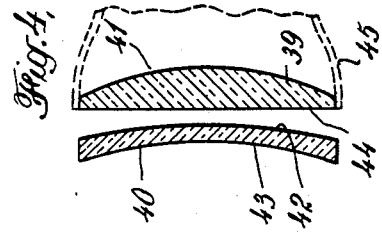
INVENTOR
Edward L. McCarthy
BY
ATTORNEYS

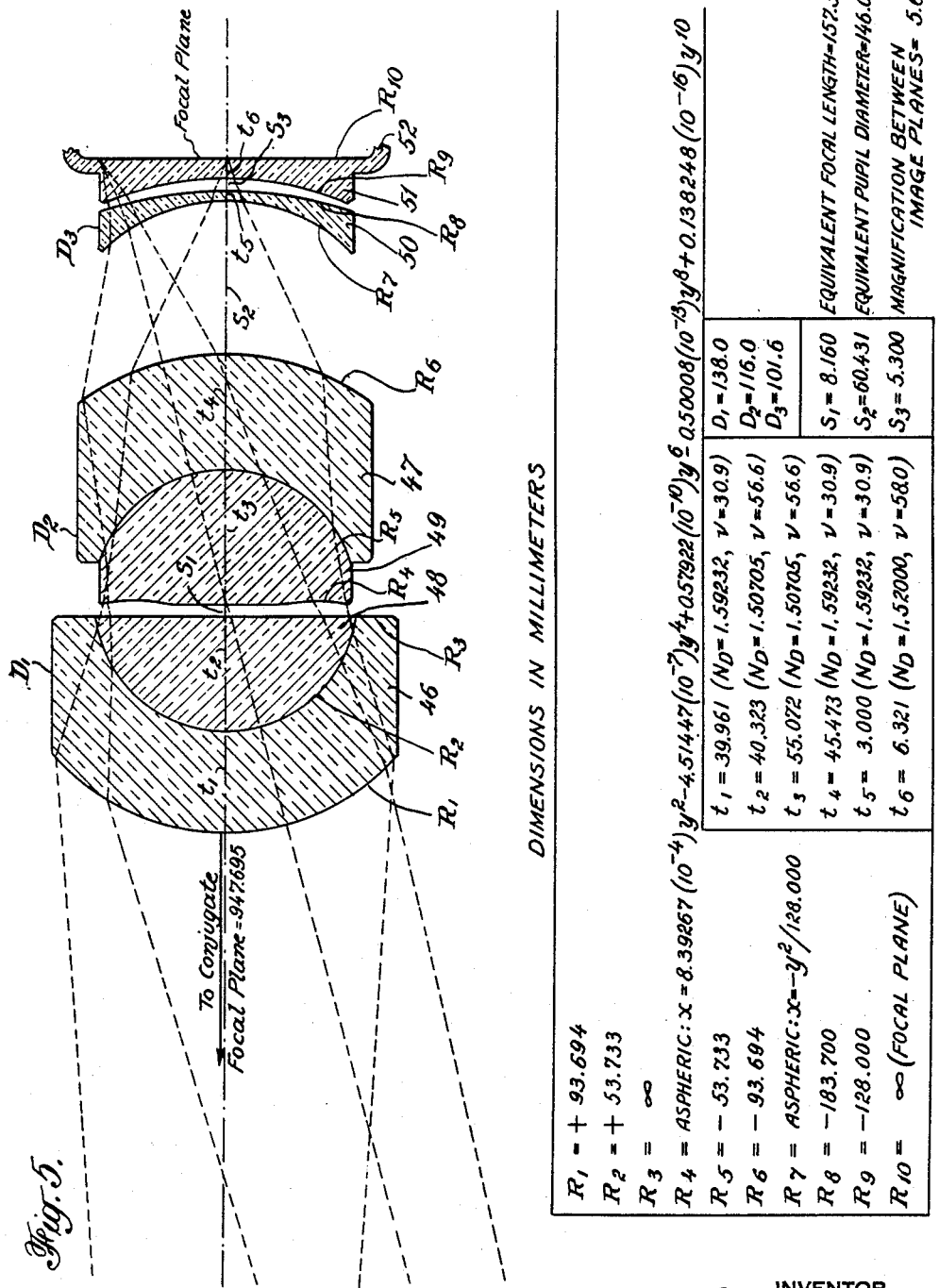

Patented Sept. 12, 1950

2,522,390

UNITED STATES PATENT OFFICE 2,522,390

LENS SYSTEM

Edward L. McCarthy, Glenbrook, Conn., assignor to The Perkin-Elmer Corporation, Glenbrook, Conn., a corporation of New York Application July 4, 1945, Serial No. 603,150

12 Claims. (Cl. 88—57)

This invention relates to lens systems suitable for projection and camera purposes and is concerned more particularly with a novel refracting lens system of unusually great light grasp and excellent definition over useful field angles of at least 32°. The new system may be employed for projection, camera, and other purposes and its characteristics are such that it may be used to especial advantage in television receivers for projecting upon a viewing screen an enlargement of a cathode ray tube image. An embodiment of the invention for that application will, accordingly, be illustrated and described in detail for purposes of explanation, although it will be apparent from the disclosure that the utility of the system is not restricted to that specific use.

The employment of an optical system in a television receiver in association with a cathode ray tube is not new, and systems of various kinds including lenses or spherical mirrors have been proposed for the purpose. One such television projector system utilizes the combination of a spherical mirror and an aspheric corrector plate devised by Schmidt, and the Schmidt system would appear to be highly desirable, because it affords clarity of definition at speeds, and fields of view at such speeds, that have not been obtainable with prior refracting systems. Practically, however, Schmidt systems for television receiver use have a number of disadvantages, as, for example, in a television receiver employing a Schmidt combination, the central area of the mirror is useless, because that area either must be cut away to permit insertion of the cathode ray tube through the mirror, or else must be blackened to prevent reflection upon the tube screen and resultant loss of contrast in the final image. Since the emission of light from the fluorescent screen of the tube obeys Lambert's law and the brightness of the emitted light decreases with the cosine of the direction angle, the central and most brilliant part of the emission is lost, when a Schmidt system is used.

Another disadvantage of the Schmidt system as against a refracting system arises from the greater difficulty of manufacture and of alignment of the component parts. In the manufacture of refracting surfaces, the tolerances are about four times greater than those permissible in making reflecting surfaces, and at cemented faces having relative indices, as in the refracting system of the invention, the factor is as high as about twenty-two times. Similarly, errors in alignment of the parts of a Schmidt system have a greater effect on definition than in a refracting system.

The present invention is directed to the provision of a refracting lens system, which is particularly suitable for use in television receivers and offers numerous advantages over prior optical systems employed for that purpose. The new system has a light grasp approximating that obtainable with Schmidt systems, but it is less expensive to manufacture and to align and it utilizes the brightest part of the emitted light. The new system has a substantially greater light grasp than the prior refracting systems, and the main part of the system has a high degree of spherical symmetry, so that the system is correspondingly free of coma of all orders, except for a minor amount introduced by certain corrector surfaces, and the system is not sensitive to "squaring on" when mounted for use. The new system has a small number of component lens elements and the number of optical surfaces in contact with air is reduced to a theoretical minimum, as are therefore also the number of surfaces sensitive to manufacturing variations. The system may be readily corrected for chromatic aberration and the component lenses of the system have relatively great axial thickness, so that the variation of spherical aberration with color is small. While the elements of the new system may be made of the usual optical glass, the optical characteristics of the main elements of the system are such that those elements may be formed of well known plastics and can, accordingly, be produced by relatively inexpensive molding operations.

The new system may have a light grasp of at least f/1.1 over an anastigmatically flat field of at least 32° and of at least f/1.0 over a curved stigmatic field of at least 45°, these values applying when one conjugate of the system is infinite and being naturally somewhat reduced when both conjugates are finite. The system includes a main part or objective which consists of a pair of meniscus elements, which are dispersive, have inner and outer spherical surfaces, and lie with their concave surfaces opposed, and a ball element, which lies between the meniscus elements in contact with their inner surfaces. The ball element is divided into two parts, both of which are collective, and asphericity is imparted to one or both of the opposed surfaces of those parts. The opposed surfaces of the inner elements lie at approximately the center of symmetry of the objective and they are of such form as to correct not only axial spherical aberration but also extra-axial spherical aberration. Since all radii of the meniscus elements and of the outer surfaces of the inner elements of the objective are struck from a common center at approximately the center of symmetry, or from centers close to one another and to the center of symmetry, the system has a high degree of symmetry and is substantially free of coma and astigmatism, except as they may be introduced by reason of the use of the aspheric surfaces. By making the net lens power of the corrector surfaces zero, no astigmatism is introduced by their use but it may be desirable to give the surfaces a form that produces a slight astigmatism in order to gain a reduction in power of the outer zones of the corrector surfaces, an advantage of such procedure being an increase in possible light grasp. Since the objective is substantially spherically symmetrical, the nodal points of the objective approximately coincide and lie substantially at the center of symmetry. In an objective for use alone, the spherical surfaces of the meniscus and ball elements may be concentric about a common center at the center of symmetry, in which case the nodal points are in coincidence and lie at the center of symmetry.

The new system, in which only the objective above described is used, has a strongly positive Petzval sum, which is in fact substantially equal to the reciprocal of the focal length of the system. For some purposes, this may not be objectionable, but in order to obtain conjugate image surfaces that are flat and stigmatic, the system must be modified so that its Petzval sum is close to zero. In the new system, this is accomplished by providing a field corrector which lies in the vicinity of the nearer conjugate, and removes both astigmatism and field curvature. While a field flattener consisting of a single negative lens element having flat and spherical surfaces, has been proposed heretofore for use with a Petzval lens, such a flattener cannot be used in the new system, because of the considerable coma that it would introduce and of the small angular field that it would pass. The field corrector of the new system may take various forms and comprise one or two elements, the latter arrangement being preferred for color television, since the elements may be spaced apart to provide space within which a filter disc may be rotated. Ordinarily, it is desirable to include an aspheric surface in the corrector, as, for example, it may include an element having an aspheric surface and a flat surface, or a pair of elements, one bounded by an aspheric surface and a spherical surface and the other by a spherical surface and a flat surface. With any of the forms of the corrector, the final flat stigmatic image appears substantially in the plane of the flat surface.

In a form of the new system, in which a field corrector is not used, the spherical surfaces of the meniscus and ball elements may be concentric about a common center at the pupil aperture and, in that case, the only source of coma and astigmatism is the aspheric corrector surfaces on the parts of the ball element. When the field corrector is employed, some departure from perfect symmetry in the objective additional to that represented by the corrector surfaces may be adopted. However, a close approximation of symmetry, together with its corresponding advantages, is obtained.

For a better understanding of the invention, reference may be made to the accompanying drawings in which Fig. 1 is a diagrammatic longitudinal sectional view illustrating one form of the new lens system employed in a television receiver;

Fig. 2 is a diagrammatic longitudinal sectional view of a modified form of the objective;

Figs. 3 and 4 are longitudinal sectional views of modified forms of the field corrector; and Fig. 5 is a view similar to Fig. 1, showing a specific example of the new lens system together with dimensions, etc., therefor.

The lens system of the invention is illustrated in Fig. 1 in a form suitable for use in a television receiver which includes a cathode ray tube indicated at 10. The end of the tube is closed by a lens 11, the inner surface 12 of which is flat and provided with a fluorescent coating which is activated by the electron beam in the usual manner. The outer surface 13 of lens 11 is spherical. A lens 14 is mounted beyond lens 11 and spaced therefrom and lens 14 is bounded by a spherical surface 15, facing lens 11, and an aspheric surface 16. It is to be understood, of course, that surfaces 13 and 15 may in some instances depart from sphericity and, when spherical, need not be concentric. Inasmuch as lens 11 forms part of the envelope of the cathode ray tube, it must be formed of glass capable of withstanding the temperatures to which it will be exposed in operation.

The objective of the system of Fig. 1 includes a pair of dispersive meniscus elements 17, 18. Element 17 has a convex spherical surface 19 opposing lens 14, and a concave spherical surface 20, and in the system shown, the spherical surfaces are formed on different centers. Element 18 has a concave spherical surface 21 opposed to element 17, and a convex spherical surface 22. Surfaces 21 and 22 are concentric with one another and also with surface 20, in the system shown. A ball element made up of two collective parts 23, 24 lies between the meniscus elements, and part 23 has a convex spherical surface which is of the same radius of curvature as and is cemented to surface 20 of element 17. Part 24 of the ball has a convex spherical surface of the same radius of curvature as surface 21 of element 18, and the two surfaces are cemented together. The surface 25 of part 23 of the ball is aspheric, and this surface may be integral with lens 25, or else that lens may have a spherical surface to which an element of proper form to produce the desired aspheric surface is cemented. The opposed surface 26 of part 24 of the ball may be spherical or aspherical, as desired. If the surface 26 is spherical, its center of curvature is remote from the center of symmetry.

In the use of the television receiver including the corrector and objective illustrated in Fig. 1, the image produced on the fluorescent screen is magnified by the objective and appears in enlarged size on the viewing screen 27. The corrector surfaces 25, 26 at approximately the center of symmetry of the objective remove spherical aberration from all zones of the aperture, and by forming the surfaces properly, it is possible to correct not only axial, but also extra-axial spherical aberration. For most applications, it is sufficient to make one of the surfaces 25, 26 aspherical and the other spherical, a mean curvature of the two surfaces being chosen so as to minimize the introduction of coma and variation of spherical aberration with field angle. This mean curvature approximates the convergence of the light from an axial object point as it is passing through the pupil. If the net vertex power of the corrector surfaces 25, 26 is zero, no astigmatism is introduced by their use, but it is desirable to allow a slight astigmatism in order to obtain a reduction in power of the outer zones of the corrector surfaces. An advantage of this procedure is an increase in possible light grasp.

In order to correct for chromatic aberration, the elements of the field flattener and of the objective are made of optical materials of appropriate characteristics. Thus, the lens 11 and both parts of the ball element may be made of glass having the characteristics of crown glass, while lens 14 and the meniscus elements are made of a glass having the characteristics of flint glass. Except for lens 11, which forms part of the tube envelope, it is possible to form the several elements referred to of plastic resins having optical characteristics corresponding to the glasses specified above for the elements. When such resins are employed, the various elements may be made by molding, instead of the grinding operations required when glass is used, and the cost is materially reduced.

In the system shown in Fig. 1, the corrector surfaces 25, 26 are separated by an air space, but, alternatively, the necessary spherical correction of the system may be obtained by substituting for the air space, a medium of greater optical density than the parts 23, 24 of the ball and cementing the element formed of that medium to the parts of the ball. When such a substitution is made, the aspheric deformation necessary to provide the correction is greater than in the original case, since the relative index between the new corrector and the ball is considerably smaller than the index of the ball with respect to air. The advantage in making the substitution is that considerable errors in the manufacture of the aspheric surfaces can then be tolerated, since discrepancies in mechanical fit are absorbed by the cement, and optical discrepancies are kept small by the low relative index and the cement. It would be desirable to use for such a corrector element replacing the air space, a medium having a moderately high index and a reciprocal dispersion larger than that of the ball which has a lower index than the corrector. Such a pupil corrector has positive power on the axis and zero power toward the edge zones. When the corrector is made of a material having a greater reciprocal dispersion than that of the ball, the residual variation of spherical aberration with color can be brought close to zero. At the present time, however, there is no plastic resin available which has the desired characteristics, and the pupil corrector described as a substitute for the air space must be made of glass. It is also possible to replace the air space with a medium of lower mean index than that of the ball, with similar advantages. In such a case, the reciprocal dispersion of the medium is preferably smaller than that of the ball material.

As pointed out above, it is desirable for television use to make the field corrector of two separated elements, such as lenses 11, 14, since a color filter may be rotated in the space between the elements. Coma is minimized by making the surface 16 a paraboloid of revolution or some other aspheric surface appropriate to the particular application. The use of two elements in the field corrector affords flattening which makes possible control over variation of spherical aberration with field angle, and this aberration is minimized by making the power of the air space between the elements of the field corrector appreciable. Any aberration introduced by the field corrector may then be substantially compensated by minor departures from symmetry in the objective.

The utility of the new lens system is not limited to the use of materials of specific refractive indices and reciprocal dispersions. Greater light grasp is possible with materials of higher index, and the requirements are that the relative indices of the materials used should lead to favorable correction of spherical aberration and that the reciprocal dispersions of the materials should be appropriate for achromatism.

An objective in which the space between the corrector surfaces of the ball elements is filled with an element of solid optical material is illustrated in Fig. 2. This objective, as before, includes meniscus elements 28, 29 having convex and concave surfaces, the latter facing one another. The elements 30, 31 are parts of a ball lying between the meniscus elements, and these parts have opposed surfaces 32, 33 respectively. The surface 32 is aspheric and surface 33 is spherical, although it may advantageously be aspheric. The element 34 lying between surfaces 32, 33 and cemented thereto is made of barium crown type glass, while the ball elements 30, 31 are made of ordinary crown type glass, and elements 28, 29 are made of flint type glass.

Instead of using a field corrector of the form shown in Fig. 1, it is possible in some applications to use that shown in Fig. 3. The Fig. 3 corrector comprises a single element 35 having a flat surface 36 and an aspheric surface 37, which is approximately paraboloidal. When such a field flattener forms part of a system used in a television receiver, it may be mounted in the end of the cathode ray tube 38 to close the end of the tube. The flat surface 36 is then provided with a fluorescent coating.

In Fig. 4, there is illustrated another form of the field flattener which comprises a pair of lens elements 39, 40. In this flattener, surface 41 of lens 39 and surfaces 42, 43 of lens 40 are spherical, while surface 44 of lens 49 is flat. The lens 39 forms the end window of the cathode ray tube 45, and since elements 39, 40 are spaced apart, a filter disc may be mounted to rotate in the space between them. The fluorescent surface is formed on the convex surface of element 44, and while this convex curvature is somewhat unfavorable electrically, it is feasible to construct a cathode ray tube in which the fluorescent surface is of the convex curvature indicated.

In Fig. 5, there is illustrated a specific example of the new system, which includes an objective made up of meniscus elements 46, 47, and a ball consisting of elements 48, 49 between the meniscus elements. Element 46 has inner and outer concentric spherical surfaces, and the inner surface of element 47 is also spherical and substantially concentric with the surfaces of element 46 about a center at approximately the center of symmetry of the system. The convex surface of element 47 is spherical but not concentric with the concave surface of the element. However, the center of curvature of the convex surface of element 47 is close to the center of symmetry. The field flattener comprises elements 50, 51, the latter forming the end window of a cathode ray tube 52.

The constructional data for a system of the form shown in Fig. 5 having a relative aperture of substantially f/1.1, an equivalent focal length (refocussed for infinite conjugate) of about 157.3, and a field of about 30° are given in the following table:

| Radii | Thicknesses and Spaces | Characteristics of Optical Materials | |
|---|---|---|---|
| | | $N_D$ | $\nu$ |
| $R_1 = +93.694$ | $t_1 = 39.961$ | 1.59232 | 30.9 |
| $R_2 = +53.733$ | $t_2 = 45.620$ | 1.50705 | 56.6 |
| $R_3 = \infty$ | $s_1 = 4.645$ | | |
| $R_4 =$ (see note) | $t_3 = 55.072$ | 1.50705 | 56.6 |
| $R_5 = -53.733$ | $t_4 = 45.473$ | 1.59232 | 30.9 |
| $R_6 = -93.694$ | $s_2 = 60.431$ | | |
| $R_7 =$ (see note) | $t_5 = 3.000$ | 1.59232 | 30.9 |
| $R_8 = -183.700$ | $s_3 = 5.300$ | | |
| $R_9 = -128.000$ | $t_6 = 6.321$ | 1.52000 | 58.0 |
| $R_{10} = \infty$ (focal plane) | | | |

NOTE: $R_4$—aspheric: $X = 8.39267(10^{-4})y^2 - 4.51447(10^{-7})y^4 + 0.57922(10^{-10})y^6 - 0.50008(10^{-13})y^8 + 0.138248(10^{-16})y^{10}$ NOTE: $R_7$—aspheric: $X = -y^2/128.000$
Equivalent pupil diameter = 146.0
Distance to conjugate focal plane = 947.695
Magnification between image planes = 5.62

The elements in the system shown in Fig. 1 may all be made of plastic resins, except element 51 of the field flattener, which also forms part of the envelope of the cathode ray tube and must, therefore, be made of glass. The data given for the specific example have been calculated for a finite throw but it will be apparent that the data for a system of infinite throw can be calculated without difficulty.

In the system of Fig. 5, the variation of spherical aberration with field angle in the primary plane has been greatly reduced by bending the aspheric surface of part 49 of the ball to a nearly flat shape and introducing an air space adjacent to it. The form of the system in which the pupil corrector is a relatively dense optical material placed between the two parts of the ball could not be so corrected, and with existing optical materials, would result in too much color. Both objections, however, would be removed at a smaller aperture than f/1. For such a smaller aperture, a single aspheric field flattener, such as is shown in Fig. 3, would be satisfactory, but it would not be acceptable in a system to operate at f/1.

In the systems illustrated for television use, the fluorescent surface of the cathode ray tube is the object surface of the system. When the system is used for camera purposes, the surface referred to is the image surface. The new system is highly useful in a camera for photography of relatively dim objects requiring high light grasp in the objective. An example of the use of such a camera is the photography of X-ray and other fluorescent screens when the exposure is necessarily of short duration and the available light is meager. For camera purposes, a field flattener may or may not be used, as desired. When such a field flattener is employed, the element corresponding to the element, such as lens 11, which forms the window of the cathode ray tube, is preferably made of glass to avoid scratching.

The term "spherical symmetry," as used in the specification and claims, is employed in an optical sense and expresses the characteristic that all of the lens surfaces of an optical system have a common center of curvature. The term has no reference to the extent of any of the surfaces.

The claims are:

1. A lens system in substantial accordance with the following table:

[Equivalent focal length (refocussed for infinite conjugate), about 157.3; relative aperture, substantially f/1.1; field, about 30°]

| Radii | Thicknesses and Spaces | Characteristics of Optical Materials | |
|---|---|---|---|
| | | $N_D$ | $\nu$ |
| $R_1 = +93.694$ | $t_1 = 39.961$ | 1.59232 | 30.9 |
| $R_2 = +53.733$ | $t_2 = 45.620$ | 1.50705 | 56.6 |
| $R_3 = \infty$ | $s_1 = 4.645$ | | |
| $R_4 =$ (see note) | $t_3 = 55.072$ | 1.50705 | 56.6 |
| $R_5 = -53.733$ | $t_4 = 45.473$ | 1.59232 | 30.9 |
| $R_6 = -93.694$ | $s_2 = 60.431$ | | |
| $R_7 =$ (see note) | $t_5 = 3.000$ | 1.59232 | 30.9 |
| $R_8 = -183.700$ | $s_3 = 5.300$ | | |
| $R_9 = -128.000$ | $t_6 = 6.321$ | 1.52000 | 58.0 |
| $R_{10} = \infty$ (focal plane) | | | |

NOTE: $R_4$—aspheric: $X = 8.39267(10^{-4})y^2 - 4.51447(10^{-7})y^4 + 0.57922(10^{-10})y^6 - 0.50008(10^{-13})y^8 + 0.138248(10^{-16})y^{10}$ NOTE: $R_7$—aspheric: $X = -y^2/128.000$
Equivalent pupil diameter = 146.0
Distance to conjugate focal plane = 947.695
Magnification between image planes = 5.62 wherein R is the radius of a spherical surface on a lens element, except as otherwise noted, a positive radius and a negative radius indicate surfaces which are, respectively, convex and concave toward the front of the system, $t$ indicates the thickness of an element of the system, $s$ indicates the thickness of an air space measured along the axis of the system, $N_D$ is the index of refraction for the D line of the solar spectrum, and $\nu$ designates the reciprocal dispersion, all the dimensions being measured in like linear units.

2. A substantially spherically symmetrical lens system which comprises a pair of dispersive meniscus elements lying axially aligned with their concave surfaces opposed, the inner and outer surfaces of the meniscus elements being spherical and having substantially the same center of curvature, which lies at approximately the center of symmetry of the system, and a pair of inner collective elements between the meniscus elements and having outer spherical surfaces coincident with and cemented to the inner surfaces of the meniscus elements, the inner elements having spaced opposed inner surfaces at approximately the center of symmetry of the system, at least one of said opposed inner surfaces being aspheric, the asphericity being such as to correct for spherical aberration throughout substantially all zones of the aperture and the average shape of said opposed inner surfaces being convex to the longer conjugate of the system, the nodal points of the system lying approximately coincident and substantially at the center of symmetry of the system.

3. A substantially spherically symmetrical lens system which comprises a pair of dispersive meniscus elements lying axially aligned with their concave surfaces opposed, the inner and outer surfaces of the meniscus elements being spherical and having substantially the same center of curvature, which lies at approximately the center of symmetry of the system, a pair of inner collective elements between the meniscus elements and having outer spherical surfaces coincident with and cemented to the inner surfaces of the meniscus elements, the inner elements having spaced opposed inner surfaces at approximately the center of symmetry of the system, at least one of said opposed inner surfaces being aspheric, the asphericity being such as to correct for spherical aberration throughout substantially all zones of the aperture, and a corrector element filling the space between the inner elements and having an optical density different from that of the material of which the inner elements are made, the nodal points of the system lying approximately coincident and substantially at the center of symmetry of the system.

4. A substantially spherically symmetrical lens system which comprises a pair of dispersive meniscus elements lying axially aligned with their concave surfaces opposed, the inner and outer surfaces of the meniscus elements being spherical and having substantially the same center of curvature, which lies at approximately the center of symmetry of the system, a pair of inner collective elements between the meniscus elements and having outer spherical surfaces coincident with and cemented to the inner surfaces of the meniscus elements, the inner elements having spaced opposed inner surfaces at approximately the center of symmetry of the system, at least one of said opposed inner surfaces being aspheric, the asphericity being such as to correct for spherical aberration throughout substantially all zones of the aperture, and a corrector element lying between the inner surfaces of the inner elements and cemented thereto, the corrector element being of a material having a higher index of refraction than that of which the inner elements are made, the nodal points of the system lying approximately coincident and substantially at the center of symmetry of the system.

5. A substantially spherically symmetrical lens system which comprises a pair of dispersive meniscus elements lying axially aligned with their concave surfaces opposed, the inner and outer surfaces of the meniscus elements being spherical and having substantially the same center of curvature, which lies at approximately the center of symmetry of the system, a pair of inner collective elements between the meniscus elements and having outer spherical surfaces coincident with and cemented to the inner surfaces of the meniscus elements, the inner elements having spaced opposed inner surfaces at approximately the center of symmetry of the system, at least one of said opposed inner surfaces being aspheric, the asphericity being such as to correct for spherical aberration throughout substantially all zones of the aperture, and a corrector element filling the space between the inner elements, the corrector element being made of a material having a lower mean index and a smaller reciprocal dispersion than that of which the inner elements are made, the nodal points of the system lying approximately coincident and substantially at the center of symmetry of the system.

6. A lens system which comprises a substantially spherically symmetrical objective made up of a pair of dispersive meniscus elements lying axially aligned with their concave surfaces opposed, the inner and outer surfaces of the meniscus elements being spherical and having substantially the same center of curvature, which lies at approximately the center of symmetry of the objective, and a pair of collective inner elements between the meniscus elements having outer spherical surfaces coincident with and cemented to the inner surfaces of the meniscus elements, the inner elements having spaced opposed inner surfaces at approximately the center of symmetry of the objective, at least one of said opposed inner surfaces being aspheric, the asphericity being such as to correct for spherical aberration throughout substantially all zones of the aperture, and a field corrector element adjacent the nearer conjugate of the objective and having surfaces formed to correct for both astigmatism and field curvature and to reduce the Petzval sum to approximately zero.

7. A lens system which comprises a substantially spherically symmetrical objective made up of a pair of dispersive meniscus elements lying axially aligned with their concave surfaces opposed, the inner and outer surfaces of the meniscus elements being spherical and having substantially the same center of curvature, which lies at approximately the center of symmetry of the objective, and a pair of collective inner elements between the meniscus elements having outer spherical surfaces coincident with and cemented to the inner surfaces of the meniscus elements, the inner elements having spaced opposed inner surfaces at approximately the center of symmetry of the objective, at least one of said opposed inner surfaces being aspheric, the asphericity being such as to correct for spherical aberration throughout substantially all zones of the aperture, and a field corrector element adjacent the nearer conjugate of the objective and having at least one aspheric surface and a flat surface, the field corrector element being formed to correct for both astigmatism and field curvature and to reduce the Petzval sum to approximately zero.

8. A lens system which comprises a substantially spherically symmetrical objective made up of a pair of dispersive meniscus elements lying axially aligned with their concave surfaces opposed, the inner and outer surfaces of the meniscus elements being spherical and having substantially the same center of curvature, which lies at approximately the center of symmetry of the objective, and a pair of collective inner elements between the meniscus elements having outer spherical surfaces coincident with and cemented to the inner surfaces of the meniscus elements, the inner elements having spaced opposed inner surfaces at approximately the center of symmetry of the objective, at least one of said opposed inner surfaces being aspheric, the asphericity being such as to correct for spherical aberration throughout substantially all zones of the aperture, and a field corrector element adjacent the nearer conjugate of the objective and formed to correct for both astigmatism and field curvature and to reduce the Petzval sum to approximately zero, the field corrector element being formed of two parts spaced to define an air lens of negative power.

9. A lens system which comprises a substantially spherically symmetrical objective made up of a pair of dispersive meniscus elements lying axially aligned with their concave surfaces opposed, the inner and outer surfaces of the meniscus elements being spherical and having substantially the same center of curvature, which lies at approximately the center of symmetry of the objective, and a pair of collective inner elements between the meniscus elements having outer spherical surfaces coincident with and cemented to the inner surfaces of the meniscus elements, the inner elements having spaced opposed inner surfaces at approximately the center of symmetry of the objective, at least one of said opposed inner surfaces being aspheric, the asphericity being such as to correct for spherical aberration throughout substantially all zones of the aperture, and a field corrector element adjacent the nearer conjugate of the objective formed to correct for both astigmatism and field curvature and to reduce the Petzval sum to approximately zero, the field corrector element being formed of two parts having outer surfaces, of which one is aspheric and the other flat, and spaced opposed inner surfaces defining an air space of negative power.

10. A lens system which comprises a substantially spherically symmetrical objective made up of a pair of dispersive meniscus elements lying axially aligned with their concave surfaces opposed, the inner and outer surfaces of the meniscus elements being spherical and having substantially the same center of curvature, which lies at approximately the center of symmetry of the objective, and a pair of collective inner elements between the meniscus elements having outer spherical surfaces coincident with and cemented to the inner surfaces of the meniscus elements, the inner elements having spaced opposed inner surfaces at approximately the center of symmetry of the objective, at least one of said opposed inner surfaces being aspheric, the asphericity being such as to correct for spherical aberration throughout substantially all zones of the aperture, and a field corrector element adjacent the nearer conjugate of the objective and made up of two parts, one having a flat surface and a spherical surface and the other having a spherical surface and an aspheric surface, the curvature of the surfaces of the parts of the field corrector element correcting for both astigmatism and field curvature and reducing the Petzval sum approximately to zero.

11. In a television projector system including a cathode ray tube, the combination of an objective made up of a pair of dispersive meniscus elements lying axially aligned with their concave surfaces opposed, the inner and outer surfaces of the meniscus elements being spherical and having substantially the same center of curvature, which lies at approximately the center of symmetry of the objective, and a pair of collective inner elements between the meniscus elements and having outer spherical surfaces coincident with and cemented to the inner surfaces of the meniscus elements, the inner elements having spaced opposed inner surfaces at approximately the center of symmetry, at least one of said opposed inner surfaces being aspheric and the asphericity being such as to correct for spherical aberration throughout substantially all zones of the aperture, and a field corrector element forming the end wall of the tube and having surfaces formed to correct for both astigmatism and field curvature and to reduce the Petzval sum to approximately zero.

12. In a television projector system including a cathode ray tube, the combination of an objective made up of a pair of dispersive meniscus elements lying axially aligned with their concave surfaces opposed, the inner and outer surfaces of the meniscus elements being spherical and having substantially the same center of curvature, which lies at approximately the center of symmetry of the objective, and a pair of collective inner elements between the meniscus elements and having outer spherical surfaces coincident with and cemented to the inner surfaces of the meniscus elements, the inner elements having spaced opposed inner surfaces at approximately the center of symmetry, at least one of said opposed inner surfaces being aspheric and the asphericity being such as to correct for spherical aberration throughout substantially all zones of the aperture, and a field corrector element made up of two spaced parts, one forming the end wall of the tube, the parts of the corrector element having spaced surfaces defining an air lens of negative power, the surfaces of the corrector element correcting for both astigatism and field curvature and reducing the Petzval sum to approximately zero.

EDWARD L. McCARTHY.

REFERENCES CITED

The following references are of record in the file of this patent:

UNITED STATES PATENTS

| Number | Name | Date |
| --- | --- | --- |
| 35,605 | Harrison et al. | June 17, 1862 |
| 461,609 | Gundlach | Oct. 20, 1891 |
| 706,650 | Goerz | Aug. 12, 1902 |
| 2,031,792 | Richter | Feb. 25, 1936 |
| 2,100,290 | Lee | Nov. 23, 1937 |
| 2,100,291 | Lee | Nov. 23, 1937 |
| 2,170,979 | Straubel | Aug. 29, 1939 |
| 2,229,302 | Martin et al. | Jan. 21, 1941 |
| 2,295,802 | Nicoll | Sept. 15, 1942 |
| 2,332,930 | Rina | Oct. 26, 1943 |
| 2,344,756 | Warmisham | Mar. 21, 1944 |
| 2,377,268 | Rina | May 29, 1945 |
| 2,415,211 | Law | Feb. 4, 1947 |

FOREIGN PATENTS

| Number | Country | Date |
| --- | --- | --- |
| 2,193 | Great Britain | of 1859 |
| 127,058 | Great Britain | May 29, 1919 |
| 350,788 | Great Britain | June 18, 1931 |